M. L. ROWE.
PROTECTIVE COVERING FOR AUTOMOBILE DRIVERS.
APPLICATION FILED JULY 18, 1921.
1,424,215.
Patented Aug. 1, 1922.
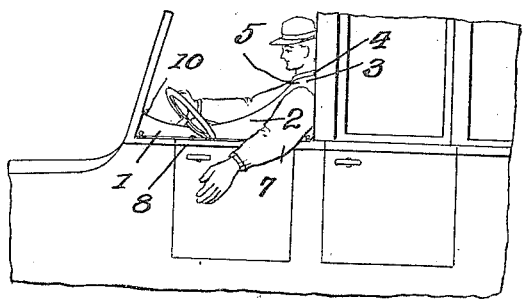
Fig. 1.
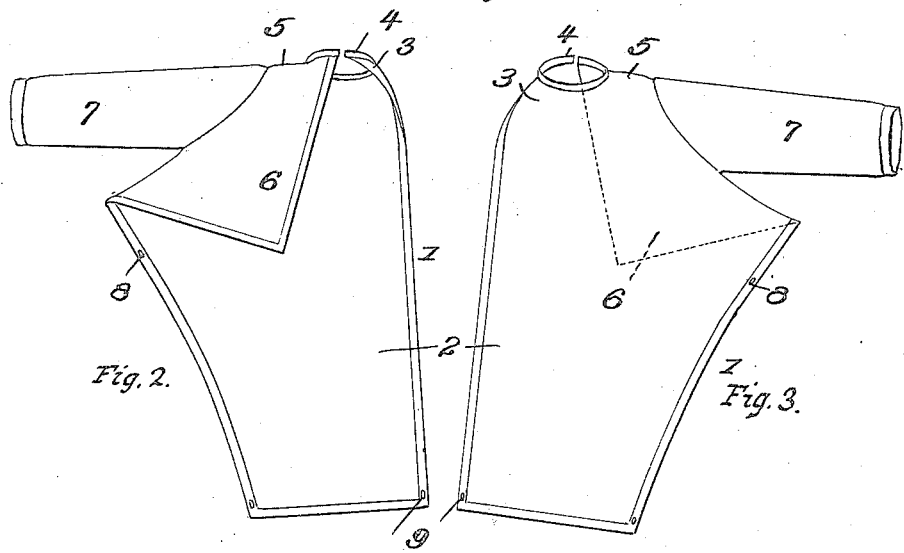
Fig. 2. Fig. 3.
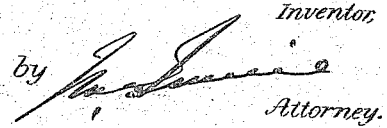
Marvin L. Rowe,
Inventor,
by
Attorney.

UNITED STATES PATENT OFFICE.

MARVIN L. ROWE, OF ALBANY, NEW YORK.

PROTECTIVE COVERING FOR AUTOMOBILE DRIVERS.

1,424,215.  Specification of Letters Patent.  Patented Aug. 1, 1922.

Application filed July 18, 1921. Serial No. 485,508.

*To all whom it may concern:*

Be it known that I, MARVIN L. ROWE, a citizen of the United States of America, residing at Albany, in the county of Albany and State of New York, have invented certain new and useful Improvements in Protective Coverings for Automobile Drivers, of which the following is a specification.

This invention relates to an improvement in protective coverings for automobile drivers and the like, and is particularly directed to a type of covering which cooperates with the car structure, and is adapted to cover that portion of the driver ordinarily exposed to the elements, that is, the upper portion of his body and arm toward the open side of the vehicle.

The improved protective structure is designed with a particular view to permitting the operator to readily and conveniently remove the same from connection with his person, when desired, without the necessity of disconnecting the protector from the car body, the protector specifically involving an apron section with which is combined a neck portion to fit around the neck of the driver, and a shoulder piece to overlie one shoulder and extend down the back of the driver to a position somewhat above the waste line. A sleeve member is formed as part of the structure, in which the arm of the driver next the open side of the vehicle is inserted. The apron is adapted to extend forwardly and to be connected at the side and end to appropriate fasteners on the vehicle side and dash. That portion of the driver next the open side of the vehicle is thus fully protected, and yet the protector as a whole may be readily disconnected from the vehicle, or the driver may readily remove that portion fitting his person, when desired, to leave the vehicle.

In the drawings:

Fig. 1 is a view in elevation illustrating the use of the protector in connection with a driver and vehicle.

Fig. 2 is an enlarged side elevation of the same.

Fig. 3 is a similar view from the opposite side.

The improved protector comprises an appropriate length of waterproof material 1, which mainly is in the form of an apron 2, having at one end thereof a formed neck portion 3, preferably embodying a spring strip 4, whereby the neck portion may be conveniently held about the neck of the driver and yet as conveniently removed when desired.

The main length of the apron portion is extended beyond what may be termed the shoulder line 5 on one side, in the form of a back or rear portion 6, which in use is designed to overlie the back of the driver on one side. A sleeve portion 7 extends from the apron at an appropriate point to receive the arm of the driver, this sleeve portion being designed to protect the driver's arm on the exposed side of the vehicle.

In use, it will be noted that with the device applied that portion of the driver on the exposed side of the vehicle, whether this be the right or left side, is thoroughly protected, as the sleeve portion protects the arm on that side, the apron extends forwardly, and the back section 6 overlies the shoulder and portion of the back on the exposed side of the driver. That side edge of the apron next the side of the vehicle on which the driver is seated, is formed as at 8 for cooperation with the usual or appropriate fastening means on the vehicle, the forward end of the apron having similar fasteners 9 for cooperation with appropriate fasteners 10 on the dash of the vehicle. Thus, the apron forms a protector against the elements on the open side of the vehicle, which protector overlies and protects the body of the driver in an effective manner.

Obviously, the driver may readily, when necessary, discard the protective covering by simply withdrawing the spring holding clip 4 from the neck and slipping his arm from the sleeve portion 7.

The protector is of decided advantage in automobile driving as it provides a means whereby the driver may be readily protected against the elements without the necessity of applying the usual storm curtains. Thus, the occupants of the vehicle are not completely shut in from air as the side of the vehicle occupied by the driver is open, and yet with the use of the protector, the driver is as effectively protected as by the use of the usual side curtains.

I claim:

A protector for automobile drivers, including a fabric section having means along one edge whereby said edge may be secured to the side of the vehicle adjacent the driver and having means along one end whereby said end may be secured to the dash of the vehicle in front of the driver, said section having a width to overlie the front of the driver, and a shoulder portion to overlie the shoulder and a portion of the driver's back immediately below the shoulder, said section being provided with a single sleeve member, whereby that portion of the driver's body next to the exposed side of the vehicle and above the upper edge of that side is protected by a protector to remain more or less permanently connected to the vehicle.

In testimony whereof I affix my signature.

MARVIN L. ROWE.